United States Patent
Uchisasai et al.

(10) Patent No.: US 11,718,138 B2
(45) Date of Patent: Aug. 8, 2023

(54) MOTORCYCLE

(71) Applicant: HONDA MOTOR CO., LTD., Tokyo (JP)

(72) Inventors: Hiroaki Uchisasai, Tokyo (JP); Kazuyuki Fukaya, Tokyo (JP); Takayuki Abe, Tokyo (JP); Hiroshi Maeda, Tokyo (JP); Kineo Tomura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 241 days.

(21) Appl. No.: 17/147,629

(22) Filed: Jan. 13, 2021

(65) Prior Publication Data
US 2021/0221191 A1 Jul. 22, 2021

(30) Foreign Application Priority Data
Jan. 16, 2020 (JP) ................................ 2020-005434

(51) Int. Cl.
*B60W 10/20* (2006.01)
*B60G 17/016* (2006.01)
*B62K 21/12* (2006.01)

(52) U.S. Cl.
CPC ......... *B60G 17/0162* (2013.01); *B60W 10/20* (2013.01); *B62K 21/12* (2013.01); *B60G 2300/12* (2013.01); *B60W 2540/18* (2013.01)

(58) Field of Classification Search
CPC .................................................... B60W 10/20
See application file for complete search history.

(56) References Cited

U.S. PATENT DOCUMENTS

| 4,447,069 A | 5/1984 | Winiecki et al. |
| 7,658,256 B2 * | 2/2010 | Kobayashi ............. B62J 45/423 180/274 |
| 7,802,649 B2 * | 9/2010 | Konno ............... G07C 9/00309 180/271 |

(Continued)

FOREIGN PATENT DOCUMENTS

| CN | 1927639 | 3/2007 |
| CN | 104395168 | 3/2015 |

(Continued)

OTHER PUBLICATIONS

Indian Office Action for Indian Patent Application No. 202114001761 dated Jan. 27, 2022.

(Continued)

*Primary Examiner* — Barry Gooden, Jr.
(74) *Attorney, Agent, or Firm* — Amin, Turocy & Watson, LLP

(57) ABSTRACT

A motorcycle includes a steering actuator configured to steer a front wheel, an actuator control unit configured to control the steering actuator, a collision determination unit configured to determine whether or not a collision has occurred in a host vehicle, and a riding determination unit configured to determine whether or not an occupant is riding the host vehicle. When it is determined that a collision has occurred and determined that no occupant is riding the host vehicle, the actuator control unit executes a step of positioning the front wheel at a position deviating from a central position.

5 Claims, 10 Drawing Sheets

(56) References Cited

U.S. PATENT DOCUMENTS

| | | | | |
|---|---|---|---|---|
| 7,878,292 | B2* | 2/2011 | Hikichi | B62K 19/30 |
| | | | | 180/219 |
| 8,193,921 | B2* | 6/2012 | Konno | B62H 5/02 |
| | | | | 340/425.5 |
| 8,606,464 | B2* | 12/2013 | Suzuki | B62K 21/00 |
| | | | | 180/219 |
| 2007/0051551 | A1 | 3/2007 | Kobayashi | |
| 2013/0041522 | A1* | 2/2013 | Mori | G07C 5/0808 |
| | | | | 701/1 |
| 2014/0277895 | A1* | 9/2014 | Shankwitz | G05D 1/0891 |
| | | | | 701/23 |
| 2015/0232091 | A1* | 8/2015 | Lich | B60W 30/09 |
| | | | | 701/1 |
| 2016/0325739 | A1* | 11/2016 | Litz | G05D 1/0891 |
| 2019/0077396 | A1 | 3/2019 | Kuttenberger | |
| 2019/0283832 | A1 | 9/2019 | Ueno et al. | |
| 2020/0331553 | A1* | 10/2020 | Kurata | G01G 19/44 |
| 2021/0309195 | A1* | 10/2021 | Oshida | B60T 8/3225 |
| 2022/0363226 | A1* | 11/2022 | Igari | B62L 3/00 |

FOREIGN PATENT DOCUMENTS

| | | |
|---|---|---|
| CN | 107031624 | 8/2017 |
| DE | 102015220901 | 4/2017 |
| DE | 102016225497 | 6/2018 |
| EP | 0001646 | 5/1979 |
| EP | 2808217 | 12/2014 |
| EP | 3508409 | 7/2019 |
| GB | 2424631 | 10/2006 |
| JP | 2010-072839 | 4/2010 |
| JP | 2011-031636 | 2/2011 |
| JP | 2011-051367 | 3/2011 |
| JP | 2011-057133 | 3/2011 |
| JP | 2011-507744 | 3/2011 |
| JP | 4985601 | 7/2012 |
| JP | 2013-060187 | 4/2013 |
| JP | 5302274 | 10/2013 |
| JP | 2017-065417 | 4/2017 |
| JP | 2018-118716 | 8/2018 |
| TW | 201518158 | 5/2015 |
| WO | 2009/077264 | 6/2009 |
| WO | 2017/208993 | 12/2017 |
| WO | 2018/025231 | 2/2018 |
| WO | 2018/212800 | 11/2018 |
| WO | 2019/155494 | 8/2019 |

OTHER PUBLICATIONS

Chinese Office Action for Chinese Patent Application No. 202110039818.4 dated Feb. 7, 2022.

Liu, "Discussion on Balance Performance of Motorcycle Tires", (2), Motorcycle Technology No. 3, Mar. 10, 2018, pp. 42-45.

Chinese Notice of Allowance for Chinese Patent Application No. 202110039818.4 dated Aug. 9, 2022.

Japanese Notice of Allowance for Japanese Patent Application No. 2020-005434 dated Oct. 5, 2021.

German Office Action for German Patent Application No. 102021100491.8 dated Apr. 20, 2023.

\* cited by examiner

MOTORCYCLE

CROSS-REFERENCE TO RELATED APPLICATION

Priority is claimed on Japanese Patent Application No. 2020-005434, filed Jan. 16, 2020, the content of which is incorporated herein by reference.

BACKGROUND OF THE INVENTION

Field of the Invention

The present invention relates to a motorcycle.

Description of Related Art

For example, Japanese Patent No. 5302274 discloses a safety device for a steering handlebar including a buffer device assembly that maintains an original direction of a front wheel by causing a handlebar to rotate in a direction of an external force of a collision.

SUMMARY OF THE INVENTION

However, in motorcycles, in a state in which no occupant is riding a motorcycle immediately after an accident has occurred, there is a need to curb occurrence of secondary damage by controlling the behavior of the self-traveling vehicle.

An aspect according to the present invention has been made in consideration of the foregoing problems, and an object thereof is to provide a motorcycle which can be made to stay near an accident scene when an accident occurs.

In order to resolve the foregoing problems and achieve the object, the present invention employs the following aspects.

(1) According to an aspect of the present invention, there is provided a motorcycle including a steering actuator configured to steer a front wheel, an actuator control unit configured to control the steering actuator, a collision determination unit configured to determine whether or not a collision has occurred in a host vehicle, and a riding determination unit configured to determine whether or not an occupant is riding the host vehicle. When it is determined that a collision has occurred and determined that no occupant is riding the host vehicle, the actuator control unit executes a front wheel steering step of positioning the front wheel at a position deviating from a central position.

According to the foregoing aspect (1), compared to a case in which the front wheel is positioned at the central position, when a collision accident occurs, it is possible to curb self-traveling of an accident vehicle which no occupant is riding. Therefore, it is possible to provide a motorcycle which can be made to stay near an accident scene when an accident occurs.

(2) In the foregoing aspect (1), in the front wheel steering step, the actuator control unit may control the steering actuator such that the front wheel is positioned in a state of being steered away from the central position.

According to the foregoing aspect (2), compared to a constitution in which the front wheel is held at the central position, it is possible to reduce a movement distance of the vehicle in a straight ahead direction. Therefore, the motorcycle can be made to stay near an accident scene when an accident occurs.

(3) In the foregoing aspect (1) or (2), in the front wheel steering step, the actuator control unit may control the steering actuator such that a steering angle of the front wheel is fixed.

According to the foregoing aspect (3), in a state in which a vehicle body has banked, it is possible to curb increase in steering angle due to self-steering. Therefore, the motorcycle can be made to stay near an accident scene when an accident occurs.

(4) In any one of the foregoing aspects (1) to (3), the motorcycle may further include a suspension device configured to support the front wheel in a steerable manner with respect to a vehicle body frame, a handlebar configured to be disposed in a manner of being able to relatively rotate with the suspension device, a handlebar fixing mechanism configured to hold the handlebar at the central position, and a handlebar control unit configured to control the handlebar fixing mechanism. The handlebar control unit may execute a handlebar fixing step of holding the handlebar at the central position.

According to the foregoing aspect (4), an outer end portion of a steering handlebar is disposed in a fixed manner in the vicinity of a position farthest from a vehicle width center. For this reason, it is possible to curb a situation in which a vehicle body cover such as a cowl comes into contact with a road surface such that the vehicle body is supported when the vehicle has fallen down, and the outer end portion of the steering handlebar can abut the road surface. Accordingly, it is possible to curb a situation in which the vehicle body cover comes into contact with a road surface and the vehicle slides on the road surface, and the vehicle can be promptly brought to a standstill due to sliding resistance between the road surface and the outer end portion of the steering handlebar. Therefore, the motorcycle can be made to stay near an accident scene when an accident occurs.

According to the aspect of the present invention, it is possible to provide a motorcycle which can be made to stay near an accident scene when an accident occurs.

DETAILED DESCRIPTION OF THE INVENTION

Hereinafter, an embodiment of the present invention will be described on the basis of the drawings. In the following description, the same reference signs are applied to constitutions having functions which are the same or similar. Further, duplicate description for the constitutions may be omitted. Unless otherwise specified in the following description, directions to the front, the rear, the top, the bottom, the left, the right, and the like are the same as directions in a vehicle, which will be described below. In the diagrams used in the following description, an arrow UP indicates a side above the vehicle, an arrow FR indicates a side in front of the vehicle, and an arrow LH indicates the left side of the vehicle.

<Entirety of Vehicle>

Figure 1:
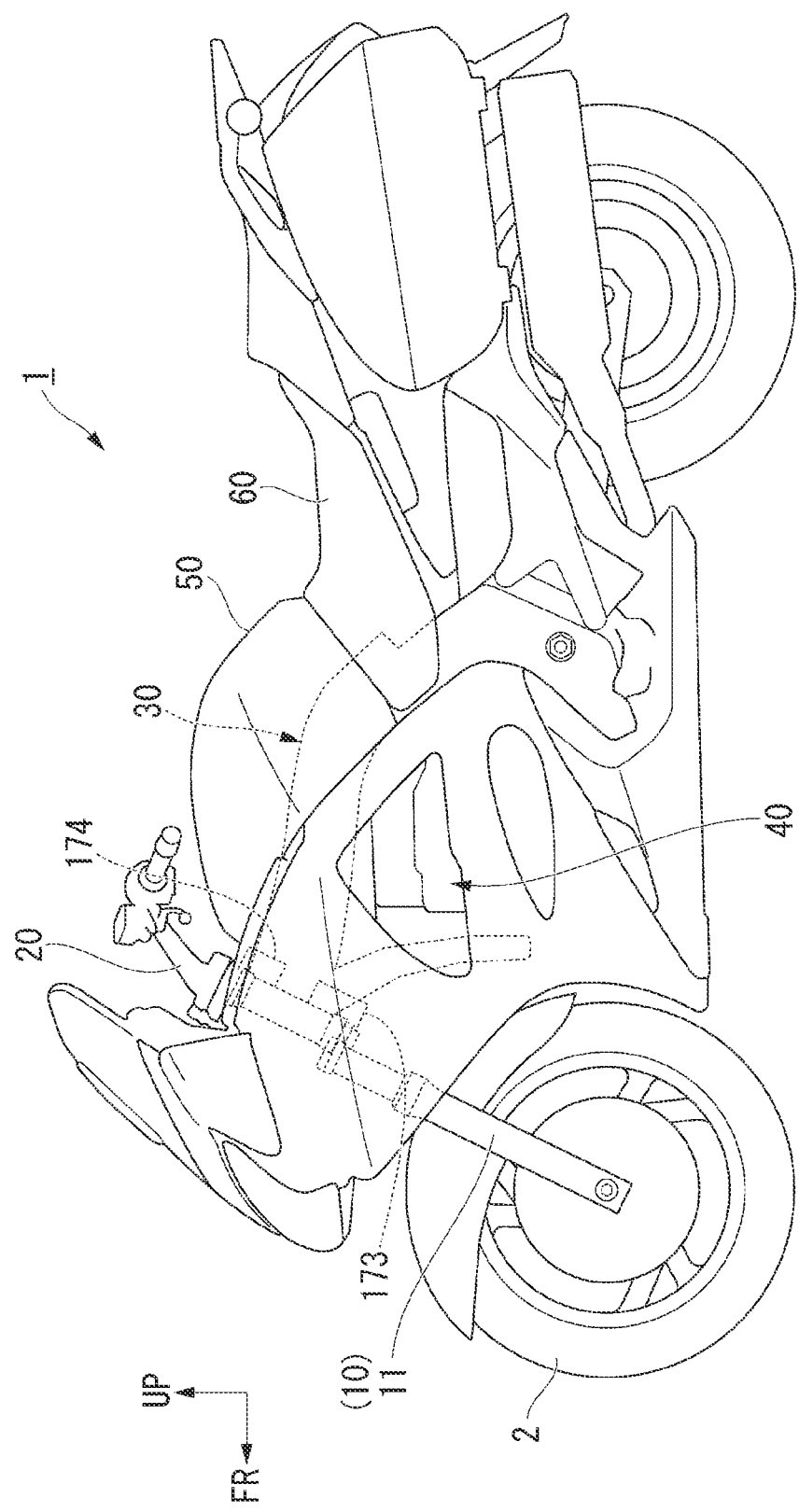
FIG. 1 is a left side view of a motorcycle of an embodiment.

FIG. 1 is a left side view of a motorcycle of the embodiment.

As illustrated in FIG. 1, a motorcycle 1 includes a front wheel suspension device 10, a steering handlebar 20, a vehicle body frame 30, a power unit 40, a fuel tank 50, and a seat 60. A front end portion of the vehicle body frame 30 supports a front wheel 2 with the front wheel suspension device 10 therebetween. The vehicle body frame 30 behind the front wheel suspension device 10 supports the power unit 40, the fuel tank 50, and the seat 60.

The front wheel suspension device 10 supports the front wheel 2 in a steerable manner with respect to the vehicle body frame 30. The front wheel suspension device 10 is turnably supported by the front end portion of the vehicle body frame 30. The front wheel suspension device 10 includes a pair of front forks 11 which rotatably support the front wheel 2, and a steering system which is coupled to the pair of front forks 11 and rotatably supported by the front end portion of the vehicle body frame 30. A steering actuator 173 is connected to the front wheel suspension device 10. The steering actuator 173 is supported by the vehicle body frame 30 and steers the front wheel 2 by causing the front wheel suspension device 10 to turn with respect to the vehicle body frame 30.

The steering handlebar 20 is a steering member to which a steering operation is input by an occupant. The steering handlebar 20 is disposed in front of the seat 60 and joined to an upper portion of the vehicle body frame 30 in a relatively rotatable manner. The steering handlebar 20 is mechanically separated from the front wheel suspension device 10. A reaction force actuator 174 is connected to the steering handlebar 20. The reaction force actuator 174 is supported by the vehicle body frame 30. The reaction force actuator 174 applies a reaction torque to the steering handlebar 20 by rotating the steering handlebar 20 on the basis of a steering angle, a steering torque, and the like of the steering handlebar 20.

The power unit 40 is an internal-combustion engine such as a gasoline engine, an electric motor, or a combination of an internal-combustion engine and an electric motor. The electric motor operates using power generated by a generator coupled to the internal-combustion engine, or power discharged from a secondary battery or a fuel cell.

<Vehicle System>

Figure 2:
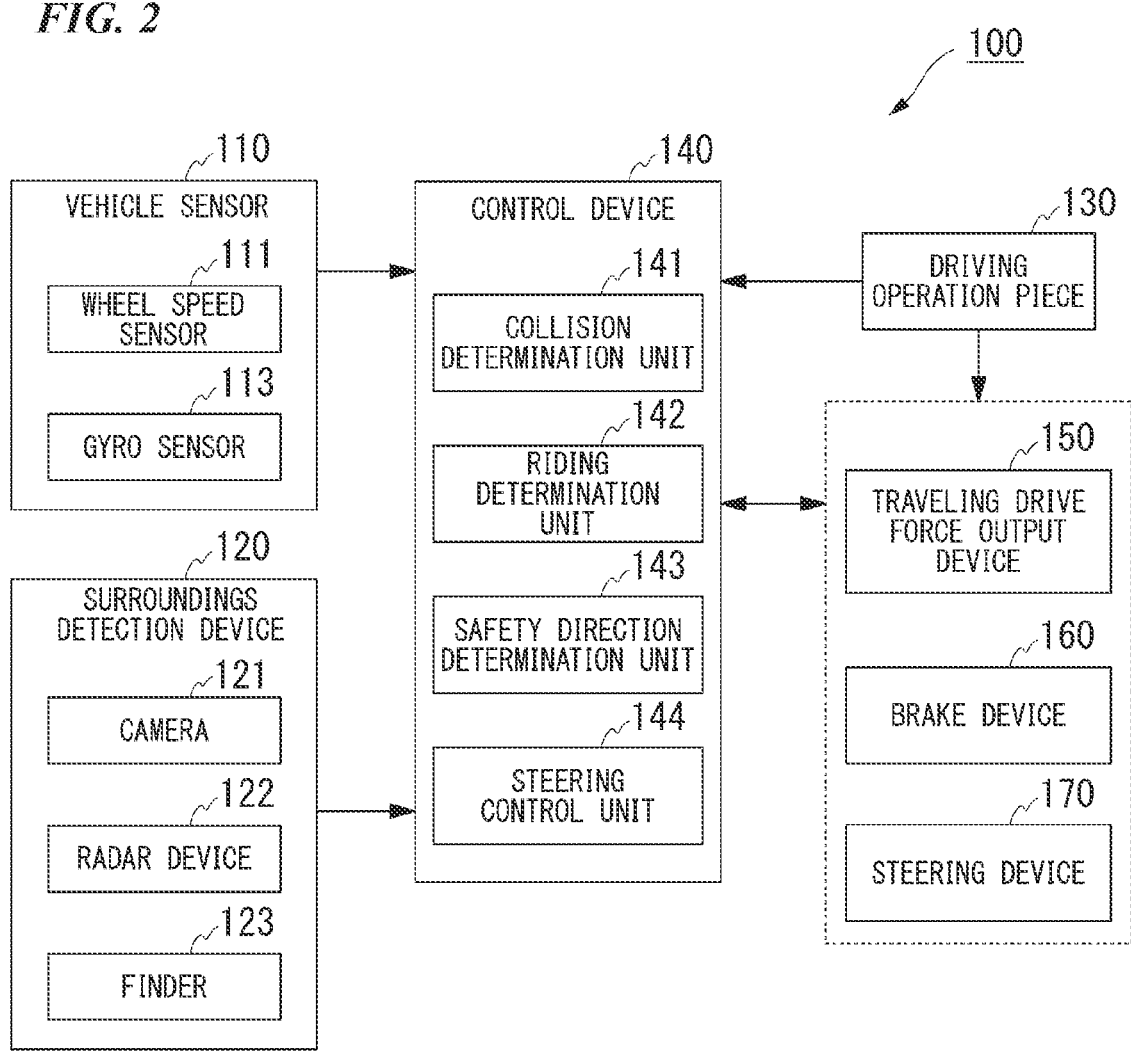
FIG. 2 is a view of a constitution of a vehicle system of the embodiment.

FIG. 2 is a view of a constitution of a vehicle system of the embodiment.

A vehicle system 100 illustrated in FIG. 2 is mounted in the motorcycle 1. For example, the vehicle system 100 includes a vehicle sensor 110, a surroundings detection device 120, a driving operation piece 130, a control device 140, a traveling drive force output device 150, a brake device 160, and a steering device 170. These devices and instruments are connected to each other through a multiplex communication line (controller area network (CAN) communication line or the like), a serial communication line, a radio communication network, or the like. The constitution illustrated in FIG. 2 is merely an example. A part of the constitution may be omitted, or another constitution may be further added.

The vehicle sensor 110 detects a state of a host vehicle. The vehicle sensor 110 includes a wheel speed sensor 111 for detecting a rotation speed of each of the front and rear wheels, a gyro sensor 113 for detecting an angular speed of the host vehicle, and a seat sensor 114 for detecting whether an occupant is seated.

The surroundings detection device 120 detects objects around the host vehicle. For example, the surroundings detection device 120 includes some or all of a camera 121, a radar device 122, and a finder 123. The surroundings detection device 120 may further include a sonar.

For example, the camera 121 is a digital camera utilizing a solid-state image capturing element such as a charge coupled device (CCD) or a complementary metal oxide semiconductor (CMOS). For example, the camera 121 periodically and repeatedly captures images around the host vehicle.

The radar device 122 radiates electromagnetic waves such as millimeter waves around a host vehicle M and detects at least a position (a distance and an azimuth) of an object by detecting electromagnetic waves reflected by the object (reflected waves).

The radar device 122 may detect a position and a speed of an object by a frequency modulated continuous wave (FM-CW) method.

The finder 123 is light a detection and ranging (LIDAR) finder. The finder 123 emits light around the host vehicle and measures scattered light. The finder 123 detects a distance to a target on the basis of a time from emission of light to reception of light. For example, the emitted light is a pulse laser beam.

For example, the driving operation piece 130 includes operation pieces such as an accelerator grip, a brake pedal, a brake lever, a shift pedal, and the steering handlebar 20. A sensor for detecting an operation amount or the presence or absence of operation is attached to the driving operation piece 130. Detection results of the sensor are output to some or all of the control device 140, the traveling drive force output device 150, the brake device 160, and the steering device 170.

The control device 140 is constituted as a single or plurality of entities electronic control unit (ECU). At least a part of the control device 140 may be realized due to cooperation between software and hardware. The control device 140 includes a collision determination unit 141, a riding determination unit 142, a safety direction determination unit 143, and a steering control unit 144.

The collision determination unit 141 determines whether or not a collision has occurred in the host vehicle. Specifically, the collision determination unit 141 determines whether or not a collision has occurred in the host vehicle on the basis of detection results of the vehicle sensor 110.

The riding determination unit 142 determines whether or not an occupant is riding the host vehicle. Specifically, the riding determination unit 142 determines whether or not an occupant is riding the host vehicle on the basis of detection results of the seat sensor 114, a grip sensor, and the like.

The safety direction determination unit 143 performs sensor fusion processing with respect to detection results of the surroundings detection device 120 and recognizes a position, a kind, a speed, and the like of an object around the host vehicle. The safety direction determination unit 143 determines a direction in which the host vehicle can safely move forward (which will hereinafter be referred to as a safety direction) on the basis of recognition results of an object around the host vehicle. The safety direction is at least any one of the right side and the left side with respect to a side right in front of the host vehicle. For example, the safety direction is a direction in which intrusion of the host vehicle on a sidewalk can be avoided, a direction in which no oncoming vehicle is present, or the like.

The steering control unit 144 controls the steering device 170 on the basis of determination results of each of the collision determination unit 141, the riding determination unit 142, and the safety direction determination unit 143. The steering control unit 144 outputs a steering command including information of a steering direction and the steering angle of the front wheel 2 to the steering device 170. The steering control unit 144 outputs a handlebar driving command including information of the steering angle of the steering handlebar 20 to the steering device 170. The steering control unit 144 adjusts the steering direction and the steering angle of the front wheel 2 in accordance with determination results of the safety direction determination unit 143, a tilt (roll angle) of the host vehicle, and the steering angle of the front wheel 2.

The traveling drive force output device 150 outputs a traveling drive force (torque) for traveling of the host vehicle to a driving wheel (rear wheel). For example, the traveling drive force output device 150 includes a combination of the power unit 40 described above, a transmission, and the like, and the ECU that controls these. The ECU controls the foregoing constitutions in accordance with information input from the driving operation piece 130.

For example, the brake device 160 includes a brake caliper, a cylinder transmitting a hydraulic pressure to the brake caliper, an electric motor generating a hydraulic pressure in the cylinder, and a brake ECU. The brake ECU controls the electric motor in accordance with information input from the driving operation piece 130 and causes a brake torque corresponding to a brake operation to be output to each of the wheels. The brake device 160 may include, as a back-up, a mechanism for transmitting a hydraulic pressure generated due to an operation of the brake lever or the brake pedal included in the driving operation piece 130 to the cylinder via a master cylinder. The brake device 160 is not limited to the constitution described above and may be an electronically controlled hydraulic brake device that transmits a hydraulic pressure of the master cylinder to the cylinder by controlling the actuator in accordance with information input from the driving operation piece 130.

Figure 3:
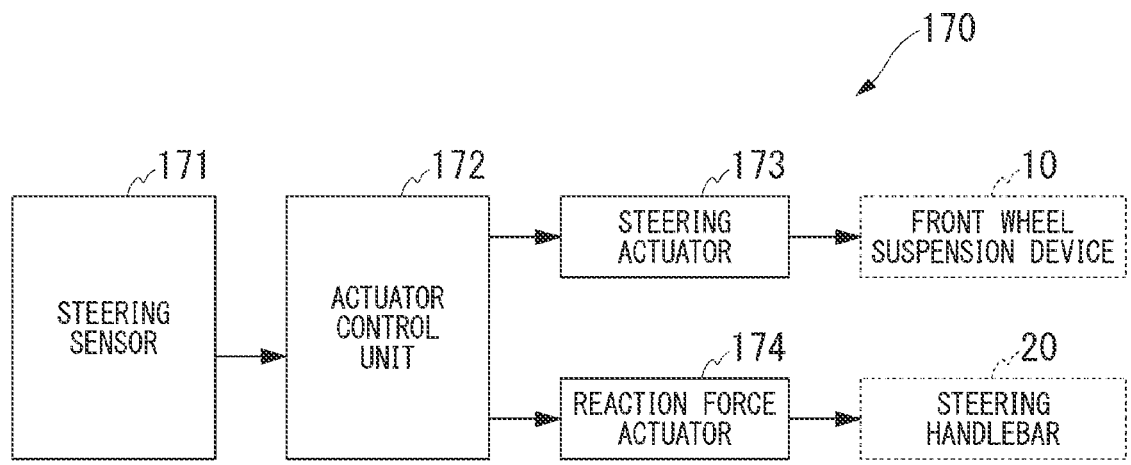
FIG. 3 is a block diagram illustrating a constitution of a steering device of the embodiment.

FIG. 3 is a block diagram illustrating a constitution of a steering device of the embodiment.

As illustrated in FIG. 3, the steering device 170 includes a steering sensor 171, an actuator control unit 172, and the steering actuator 173 and the reaction force actuator 174 which have been described above. The steering sensor 171 measures the steering angle, the steering torque, and the like of the steering handlebar 20. The actuator control unit 172 controls the steering actuator 173 and the reaction force actuator 174 on the basis of a detection value of the steering sensor 171 or a command from the steering control unit 144. The reaction force actuator 174 can fix and hold the steering handlebar 20 at a central position. The central position of the steering handlebar 20 is a position of the steering handlebar 20 in a straight ahead steering state. The steering device 170 is formed as a steer-by-wire device that causes the steering actuator 173 to steer the front wheel 2 mechanically separated from the steering handlebar 20. The actuator control unit 172 may be embedded in the control device 140.

<Function of Control Device>

Hereinafter, a flow of processing performed by the control device 140 according to the present embodiment will be described with reference to FIGS. 4 to 11. This processing flow is repeatedly performed in a state in which the host vehicle is moving forward at a predetermined speed or faster.

Figure 4:
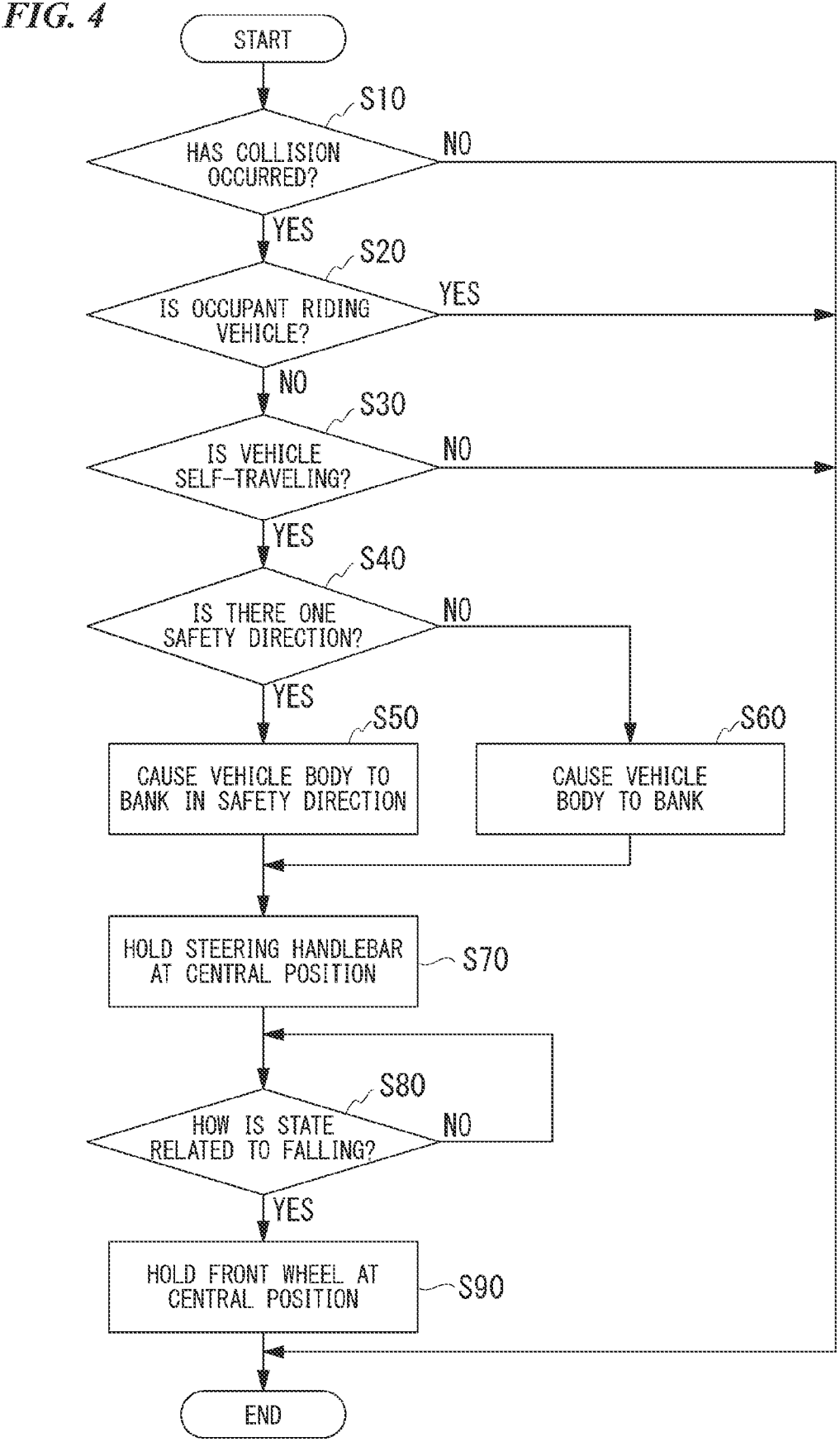
FIG. 4 is a flowchart illustrating an example of a flow of processing performed by a control device of the embodiment.
Figure 5:
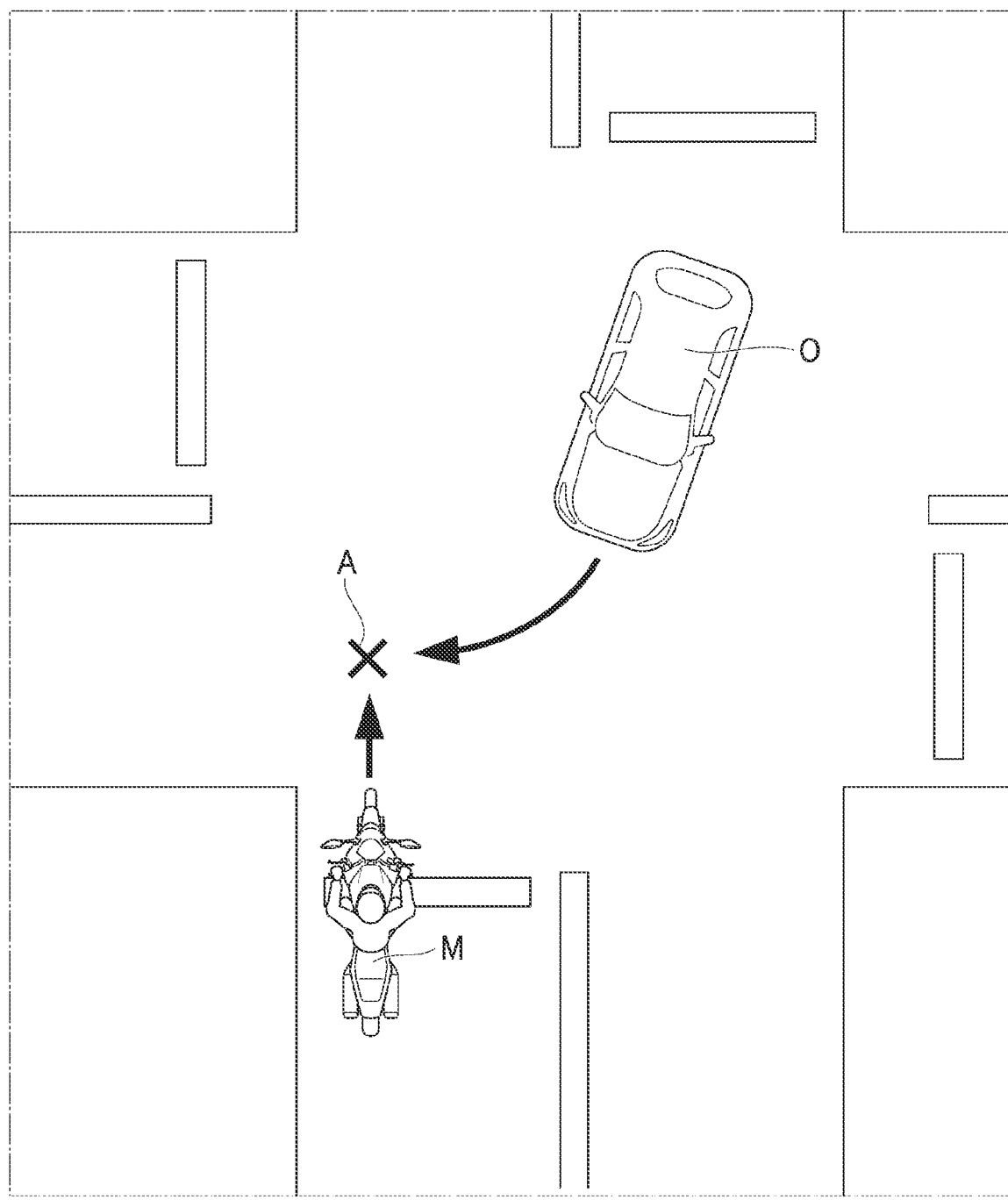
FIG. 5 is a view illustrating an example of a scene immediately before a collision accident occurs.
Figure 6:
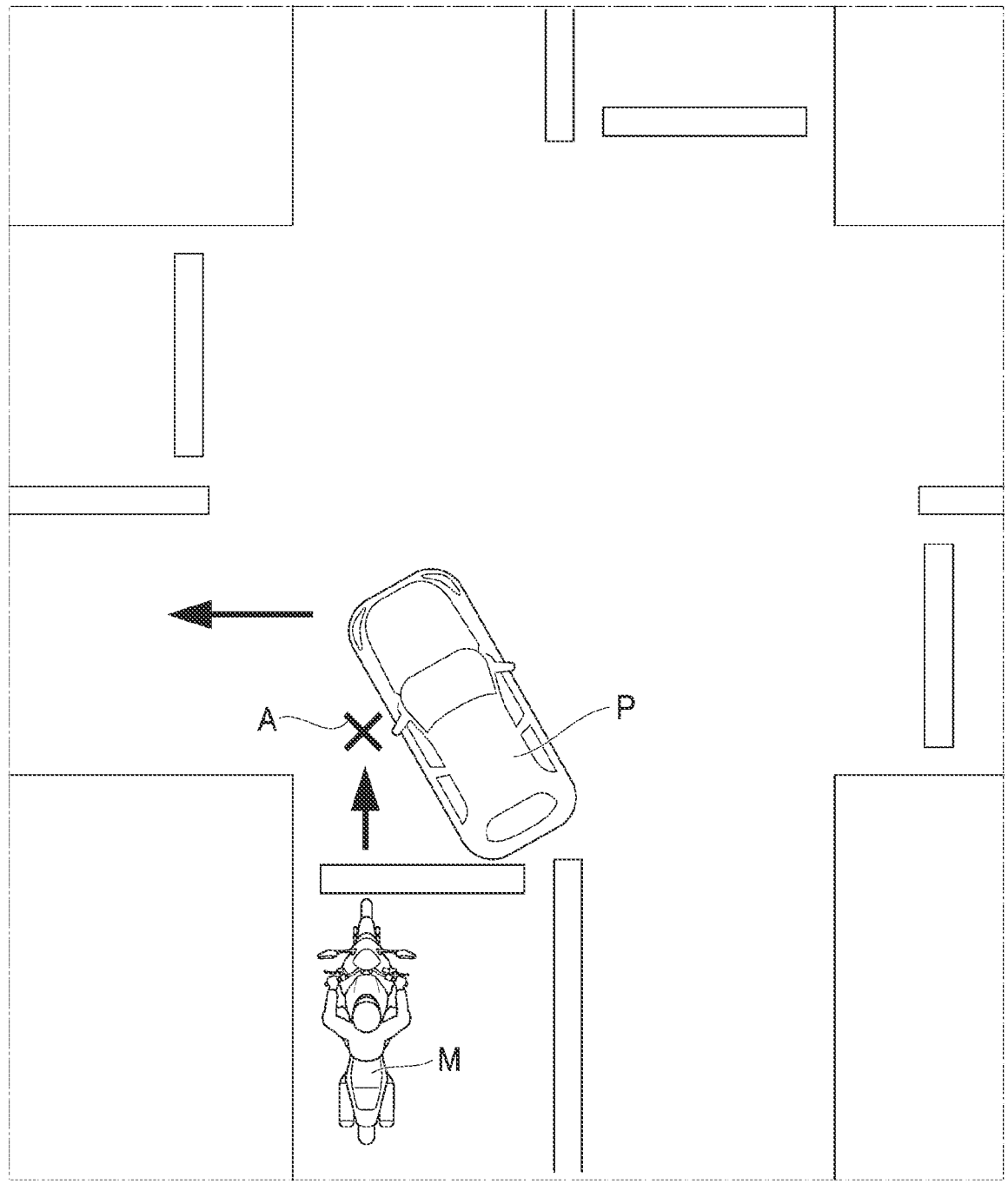
FIG. 6 is a view illustrating an example of another scene immediately before a collision accident occurs.
Figure 7:
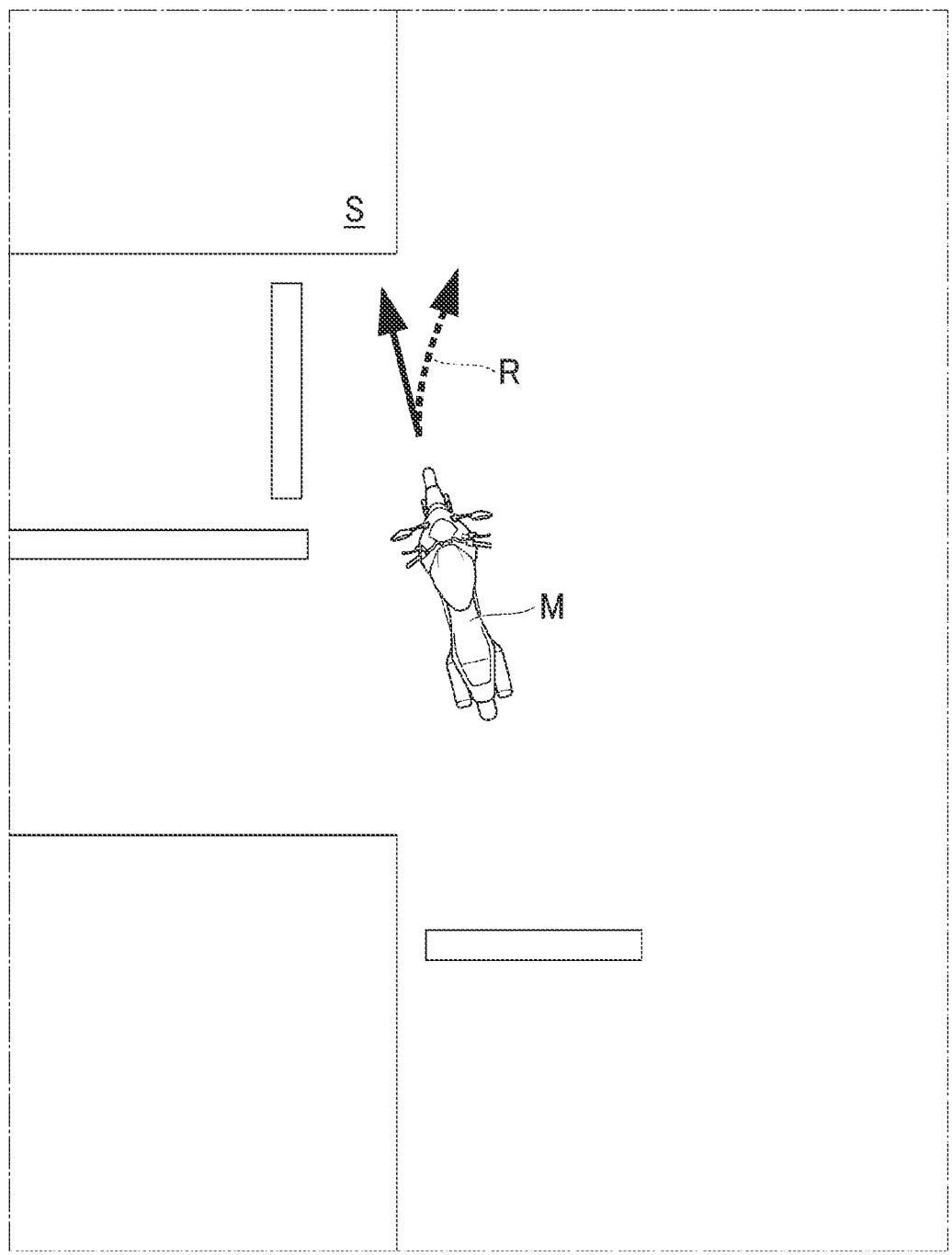
FIG. 7 is a view illustrating an example of a scene immediately after a collision accident has occurred.

FIG. 4 is a flowchart illustrating an example of a flow of processing performed by the control device of the embodiment. FIGS. 5 and 6 are views illustrating examples of scenes immediately before a collision accident occurs. FIG. 7 is a view illustrating an example of a scene immediately after a collision accident has occurred.

As illustrated in FIG. 4, in Step S10, the collision determination unit 141 determines whether or not a collision has occurred in the host vehicle. For example, it is assumed that a collision includes a head-on collision between the host vehicle M and an oncoming vehicle O turning to the right as illustrated in FIG. 5, a lateral collision between the host vehicle M and a parallel-traveling vehicle P turning to the left as illustrated in FIG. 6, and the like. When it is determined that no collision has occurred (S10: NO), the control device 140 ends a series of processing. When it is determined that a collision has occurred (S10: YES), the control device 140 shifts to the processing of Step S20.

In Step S20, the riding determination unit 142 determines whether or not an occupant is riding the host vehicle. When it is determined that an occupant is riding the host vehicle (S20: YES), the control device 140 ends a series of processing. When it is determined that no occupant is riding the host vehicle (S20: NO), the control device 140 shifts to the processing of Step S30.

In Step S30, the control device 140 determines whether or not the host vehicle is self-traveling due to the wheel. Specifically, the control device 140 determines whether or not the host vehicle is self-traveling on the basis of detection results and the like of the vehicle sensor 110. When it is determined that the host vehicle is not self-traveling (S30: NO), the control device 140 ends a series of processing. When it is determined that the host vehicle is self-traveling (S30: YES), the control device 140 shifts to the processing of Step S40. The processing of Step S30 may be performed prior to the processing of Step S20.

In Step S40, the safety direction determination unit 143 determines whether or not there is one safety direction (only the right side or the left side). For example, when a sidewalk S is present on the left side in a forward direction of the host vehicle as illustrated in FIG. 7, the safety direction determination unit 143 determines that there is only one safety direction on the right side as indicated by the arrow R in the diagram. When it is determined that there is one safety direction (S40: YES), the control device 140 shifts to the processing of Step S50. When it is determined that there are safety directions other than one direction (S40: NO), the control device 140 shifts to the processing of Step S60.

In Step S50, the steering control unit 144 outputs a steering command to the actuator control unit 172 of the steering device 170 such that a vehicle body is caused to bank in the safety direction. The processing of Step S50 will be described below in detail. Subsequently, the control device 140 shifts to the processing of Step S70 (handlebar fixing step).

In Step S60, the steering control unit 144 outputs a steering command to the actuator control unit 172 of the steering device 170 such that the vehicle body is caused to bank in any one direction (the right side or the left side). The processing of Step S60 will be described below in detail. Subsequently, the control device 140 shifts to the processing of Step S70.

In Step S70, the steering control unit 144 outputs a handlebar fixing command to the actuator control unit 172 of the steering device 170. When a handlebar fixing command is received, the actuator control unit 172 causes the steering handlebar 20 to be held at the central position by controlling the reaction force actuator 174. Subsequently, the control device 140 shifts to the processing of Step S80.

In Step S80, the control device 140 determines whether or not the host vehicle has fallen down. Specifically, the control device 140 determines whether or not the host vehicle has fallen down on the basis of detection results and the like of the vehicle sensor 110. For example, when the roll angle of the vehicle body is a predetermined angle or larger, the control device 140 determines that the host vehicle has fallen down. When it is determined that the host vehicle has fallen down (S80: YES), the control device 140 shifts to the processing of Step S90 (front-wheel centrally fixing step). When it is determined that the host vehicle has not fallen down (S80: NO), the control device 140 performs the processing of Step S80 again.

In Step S90, the steering control unit 144 outputs a front-wheel centrally fixing command to the actuator control unit 172 of the steering device 170. When a front-wheel centrally fixing command is received, the actuator control unit 172 causes the front wheel 2 to be steered to the central position and then causes the front wheel 2 to be held at the central position by controlling the steering actuator 173. The central position of the front wheel 2 is a position where the front wheel 2 is not steered in a straight ahead state. With this, the control device 140 ends a series of processing.

Figure 8:
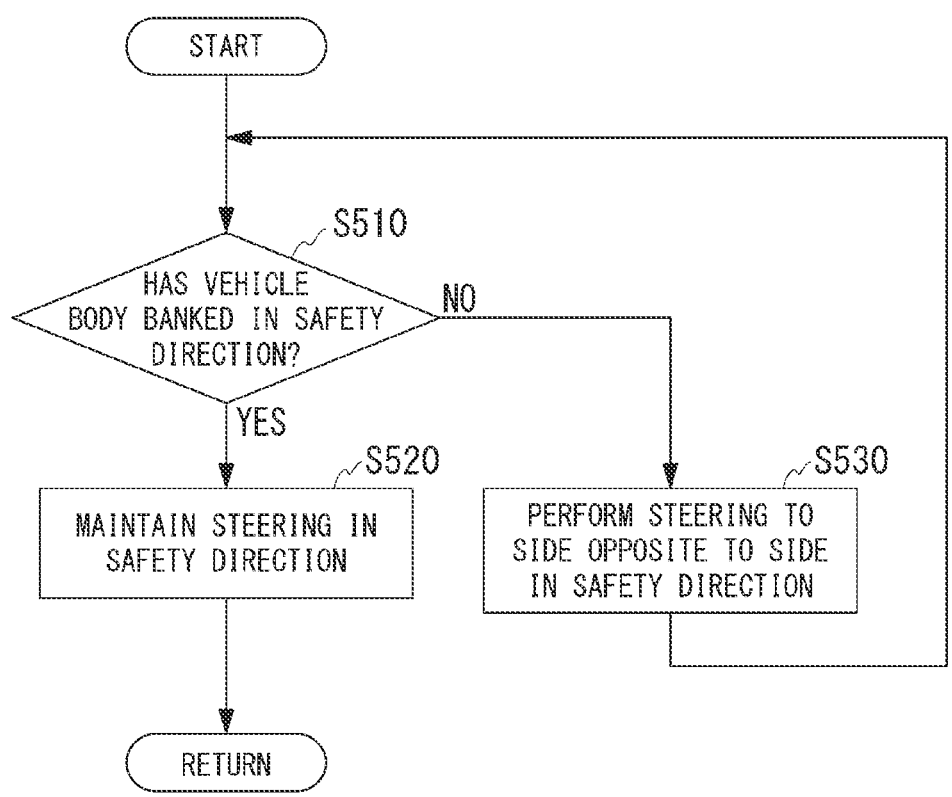
FIG. 8 is a flowchart illustrating an example of a flow of processing of causing a vehicle body to bank in a safety direction.
Figure 9:
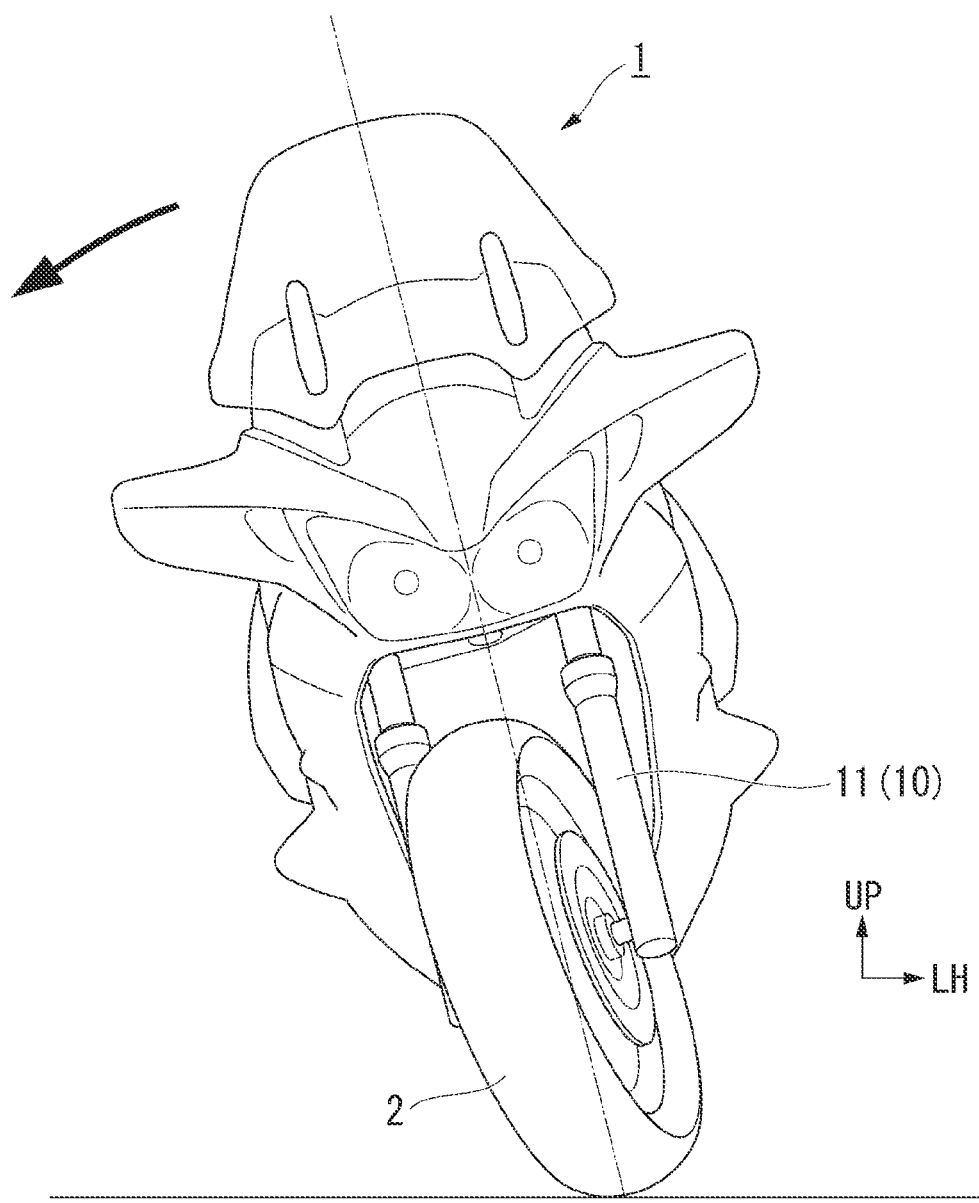
FIG. 9 is a front view of the motorcycle, and the view illustrates a relationship between banking of the vehicle body and a steering direction of a front wheel.
Figure 10:
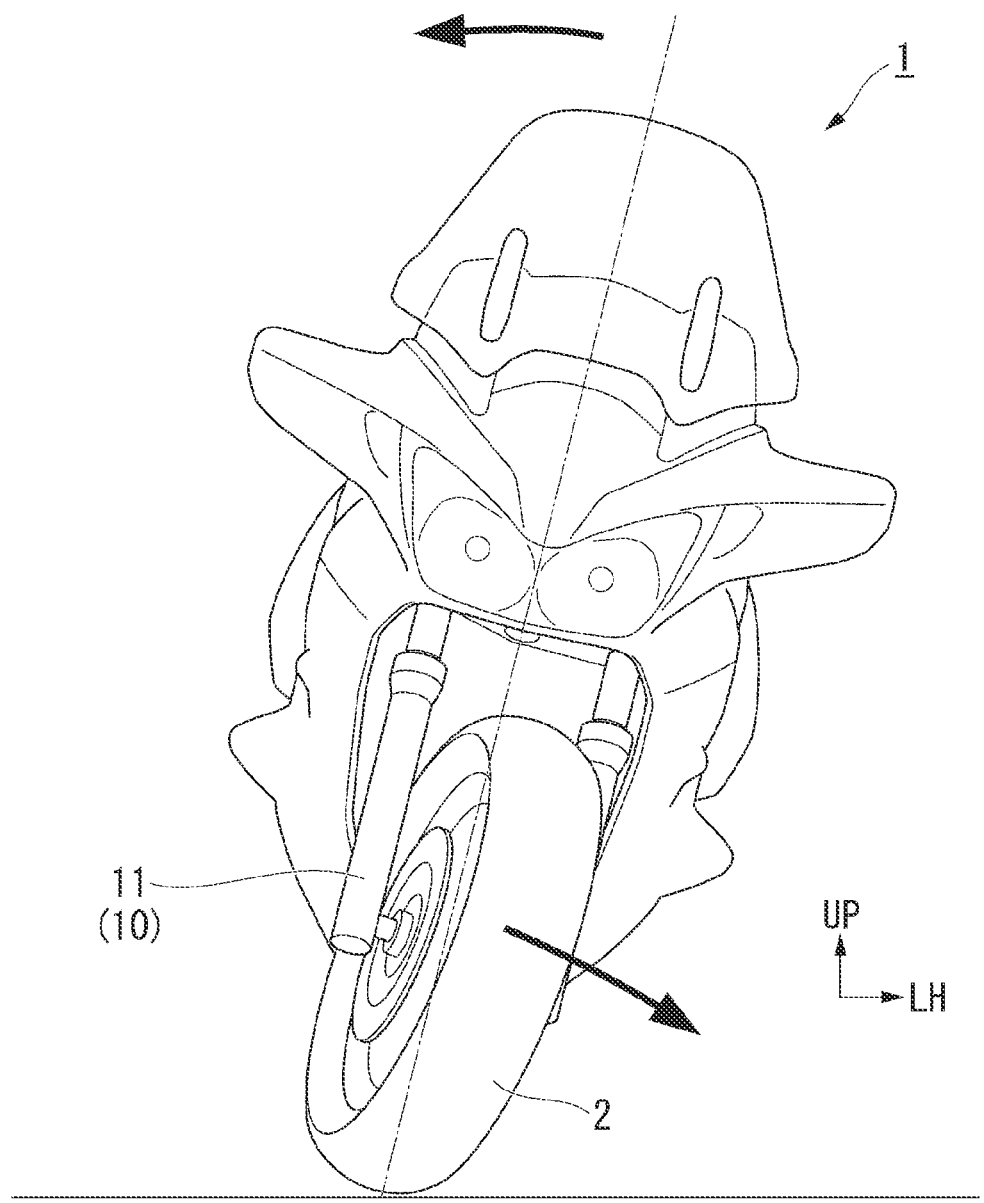
FIG. 10 is another front view of the motorcycle, and the view illustrates a relationship between banking of the vehicle body and the steering direction of the front wheel.

FIG. 8 is a flowchart illustrating an example of a flow of processing of causing the vehicle body to bank in the safety direction. FIGS. 9 and 10 are front views of the motorcycle, and the views illustrate a relationship between banking of the vehicle body and the steering direction of the front wheel. The flowchart illustrated in FIG. 8 describes the processing of Step S50 of the flowchart in FIG. 4 in more detail.

In Step S50, the control device 140 outputs a steering command to the actuator control unit 172 of the steering device 170 such that the front wheel 2 is positioned at a position deviating from the central position. Specifically, the control device 140 performs the following processing.

As illustrated in FIG. 8, in Step S510, the control device 140 determines whether or not the vehicle body has banked in the safety direction. The control device 140 distinguishes the banking direction of the vehicle body on the basis of detection results and the like of the vehicle sensor 110. When it is determined that the vehicle body has banked in the safety direction (S510: YES), the control device 140 shifts to the processing of Step S520 (front wheel steering step). When it is determined that the vehicle body has not banked in the safety direction (S510: NO), the control device 140 shifts to the processing of Step S530.

In Step S520, the steering control unit 144 outputs a first steering command to the actuator control unit 172. The first steering command includes a command of positioning the front wheel 2 on a steering side with respect to the central position. For example, when the safety direction is the right side and the vehicle body has banked to the right side, as illustrated in FIG. 9, the front wheel 2 is steered to the right side due to self-steering. That is, the first steering command includes a command of maintaining steering in the safety direction. Specifically, the steering control unit 144 outputs a command to the actuator control unit 172 such that the steering angle of the front wheel 2 is fixed. When the first steering command is received, the actuator control unit 172 controls the steering actuator 173 such that the steering angle of the front wheel 2 is fixed. When the steering angle of the front wheel 2 is fixed, a banking angle of the vehicle body increases in the steering direction of the front wheel 2. With this, the processing of causing the vehicle body to bank in the safety direction ends.

In Step S530, the steering control unit 144 outputs a second steering command to the actuator control unit 172. The second steering command includes a command of increasing the steering angle to a side opposite to a side in the safety direction. For example, when the safety direction is the right side and the vehicle body has banked to the left side, as illustrated in FIG. 10, the front wheel 2 is steered to the left side due to self-steering. Here, the steering control unit 144 outputs a command to the actuator control unit 172 such that the steering angle of the front wheel 2 is further increased to the left side. When the second steering command is received, the actuator control unit 172 controls the steering actuator 173 such that the steering angle of the front wheel 2 is increased. Accordingly, the vehicle body is in a reversely steered state and rolls to the right side. Further, the processing of Step S510 is performed again.

Figure 11:
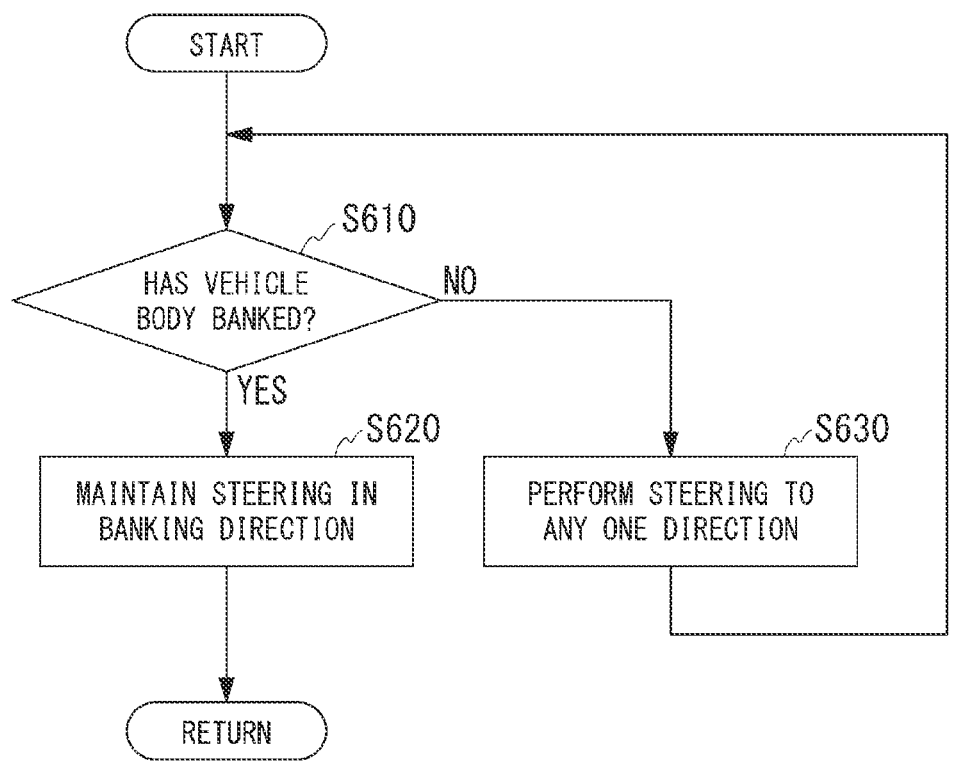
FIG. 11 is a flowchart illustrating an example of a flow of processing of causing the vehicle body to bank.

FIG. 11 is a flowchart illustrating an example of a flow of processing of causing the vehicle body to bank. The flowchart illustrated in FIG. 11 describes the processing of Step S60 of the flowchart in FIG. 4 in more detail.

In Step S60, the control device 140 outputs a steering command to the actuator control unit 172 of the steering device 170 such that the front wheel 2 is positioned at a position deviating from the central position. Specifically, the control device 140 performs the following processing.

As illustrated in FIG. 11, in Step S610, the control device 140 determines whether or not the vehicle body has banked. The control device 140 determines whether or not the vehicle body has banked on the basis of detection results and the like of the vehicle sensor 110. When it is determined that the vehicle body has banked (S610: YES), the control device 140 shifts to the processing of Step S620. When it is determined that the vehicle body has not banked (S610: NO), the control device 140 shifts to the processing of Step S630.

In Step S620, the steering control unit 144 outputs a third steering command to the actuator control unit 172. The third steering command includes a command of positioning the front wheel 2 on a steering side with respect to the central position. For example, when the vehicle body has banked to the right side, the front wheel 2 is steered to the right side due to self-steering. Here, the steering control unit 144 outputs a command to the actuator control unit 172 such that the steering angle of the front wheel 2 is fixed. When the third steering command is received, the actuator control unit 172 controls the steering actuator 173 such that the steering angle of the front wheel 2 is fixed. When the steering angle of the front wheel 2 is fixed, the banking angle of the vehicle body increases in the steering direction of the front wheel 2. With this, the processing of causing the vehicle body to bank ends.

In Step S630, the steering control unit 144 outputs a fourth steering command to the actuator control unit 172. The fourth steering command includes a command of steering the front wheel 2 to the right side or the left side. When the fourth steering command is received, the actuator control unit 172 controls the steering actuator 173 such that the front wheel 2 is steered to the right side or the left side. Accordingly, the vehicle body banks to a side opposite to a side in the steering direction. Further, the processing of Step S610 is performed again.

As described above, the motorcycle 1 of the present embodiment includes the steering actuator 173 that steers the front wheel 2, and the actuator control unit 172 that controls the steering actuator 173. When it is determined that a collision has occurred in the host vehicle and determined that no occupant is riding the host vehicle, the actuator control unit 172 controls the steering actuator 173 in Steps S520 and S620 such that the front wheel 2 is positioned at a position deviating from the central position. According to this constitution, compared to a case in which the front wheel 2 is positioned at the central position, when a collision accident occurs, it is possible to curb self-traveling of an accident vehicle which no occupant is riding. Therefore, it is possible to provide the motorcycle 1 which can be made to stay near an accident scene A (refer to FIGS. 5 and 6) when an accident occurs.

The actuator control unit 172 controls the steering actuator 173 in Steps S520 and S620 such that the front wheel 2 is positioned in a state of being steered away from the central position. According to this constitution, compared to a constitution in which the front wheel 2 is held at the central position, it is possible to reduce a movement distance of the vehicle in a straight ahead direction. Therefore, the motorcycle 1 can be made to stay near the accident scene A when an accident occurs.

Moreover, the actuator control unit 172 controls the steering actuator 173 in Steps S520 and S620 such that the front wheel 2 is positioned on a steering side with respect to the central position. According to this constitution, the front wheel 2 is steered without going through the central position. Therefore, compared to a constitution in which the front wheel 2 is positioned on a side opposite to a steering side with respect to the central position, it is possible to reduce the movement distance of the vehicle in the straight ahead direction. Therefore, the motorcycle 1 can be made to stay near the accident scene A when an accident occurs.

The actuator control unit 172 controls the steering actuator 173 in Steps S520 and S620 such that the steering angle of the front wheel 2 is fixed. According to this constitution, in a state in which the vehicle body has banked, it is possible to curb increase in steering angle due to self-steering. Therefore, the motorcycle 1 can be made to stay near the accident scene A when an accident occurs.

The actuator control unit 172 controls the reaction force actuator 174 such that the steering handlebar 20 is held at the central position. According to this constitution, an outer end portion of the steering handlebar 20 is disposed in a fixed manner in the vicinity of a position farthest from a vehicle width center. For this reason, it is possible to curb a situation in which a vehicle body cover such as a cowl comes into contact with a road surface such that the vehicle body is supported when the vehicle has fallen down, and the outer end portion of the steering handlebar 20 can abut the road surface. Accordingly, it is possible to curb a situation in which the vehicle body cover comes into contact with a road surface and the vehicle slides on the road surface, and the vehicle can be promptly brought to a standstill due to sliding resistance between the road surface and the outer end portion of the steering handlebar 20. Therefore, the motorcycle 1 can be made to stay near an accident scene when an accident occurs.

After Step S520 or Step S620 is executed, the actuator control unit 172 controls the steering actuator 173 such that the front wheel 2 is held at the central position. According to this constitution, it is possible to curb a situation in which the front wheel 2 comes into contact with a road surface when the vehicle has fallen down. Accordingly, the motorcycle 1 can be made to stay near the accident scene A when an accident occurs.

The present invention is not limited to the foregoing embodiment which has been described with reference to the drawings, and various modification examples can be conceived within the technical scope thereof.

For example, the foregoing embodiment has a steer-by-wire structure in which the front wheel suspension device 10 and the steering handlebar 20 are mechanically separated from each other. However, the front wheel suspension device and the steering handlebar may be mechanically coupled to each other.

In the foregoing embodiment, when the actuator control unit 172 receives a handlebar fixing command, the reaction force actuator 174 is driven to hold the steering handlebar 20. However, a mechanism for holding the steering handlebar 20 is not limited thereto. For example, a fixing mechanism of mechanically coupling the steering handlebar 20 to the vehicle body frame 30 may be provided.

In the foregoing embodiment, in Steps S520 and S620, the actuator control unit 172 controls the steering actuator 173 such that the steering angle of the front wheel 2 is fixed, but the embodiment is not limited thereto. The actuator control unit 172 need only cause the front wheel 2 to be positioned on a steering side with respect to the central position and may control the steering actuator 173 such that the steering angle is gradually reduced, for example.

In the foregoing embodiment, before Steps S50 and 60 are executed, the control device 140 may control the brake device 160 such that the vehicle is decelerated. Accordingly, since a sliding distance of the fallen vehicle can be reduced, the vehicle can be promptly brought to a standstill. Therefore, the motorcycle 1 can be made to stay near an accident scene when an accident occurs.

In the foregoing embodiment, the vehicle sensor 110 includes the gyro sensor 113. However, in place of the gyro sensor 113, an acceleration sensor for detecting an acceleration of the host vehicle may be included therein.

Further, the constituent elements in the foregoing embodiment can be suitably replaced with known constituent elements within a range not departing from the gist of the present invention.

What is claimed is:
1. A motorcycle comprising:
a steering actuator configured to steer a front wheel;
an actuator control unit configured to control the steering actuator;
a collision determination unit configured to determine whether or not a collision has occurred in a host vehicle; and
a riding determination unit configured to determine whether or not an occupant is riding the host vehicle,
wherein when it is determined that a collision has occurred and determined that no occupant is riding the host vehicle, the actuator control unit executes a front wheel steering step of positioning the front wheel at a position deviating from a central position.

2. The motorcycle according to claim 1,
wherein in the front wheel steering step, the actuator control unit controls the steering actuator such that the front wheel is positioned in a state of being steered away from the central position.

3. The motorcycle according to claim 1,
wherein in the front wheel steering step, the actuator control unit controls the steering actuator such that a steering angle of the front wheel is fixed.

4. The motorcycle according to claim 1 further comprising:
   a suspension device configured to support the front wheel in a steerable manner with respect to a vehicle body frame;
   a handlebar configured to be relatively rotatable with the suspension device;
   a handlebar fixing mechanism configured to hold the handlebar at the central position; and
   a handlebar control unit configured to control the handlebar fixing mechanism,
   wherein the handlebar control unit executes a handlebar fixing step of holding the handlebar at the central position.

5. The motorcycle according to claim 1,
wherein the actuator control unit executes a front-wheel centrally fixing step of holding the front wheel at the central position after the front wheel steering step is executed.

* * * * *